Nov. 13, 1956
W. W. SLAGHT
2,770,114
UNIVERSAL JOINT ASSEMBLY
Filed March 22, 1954
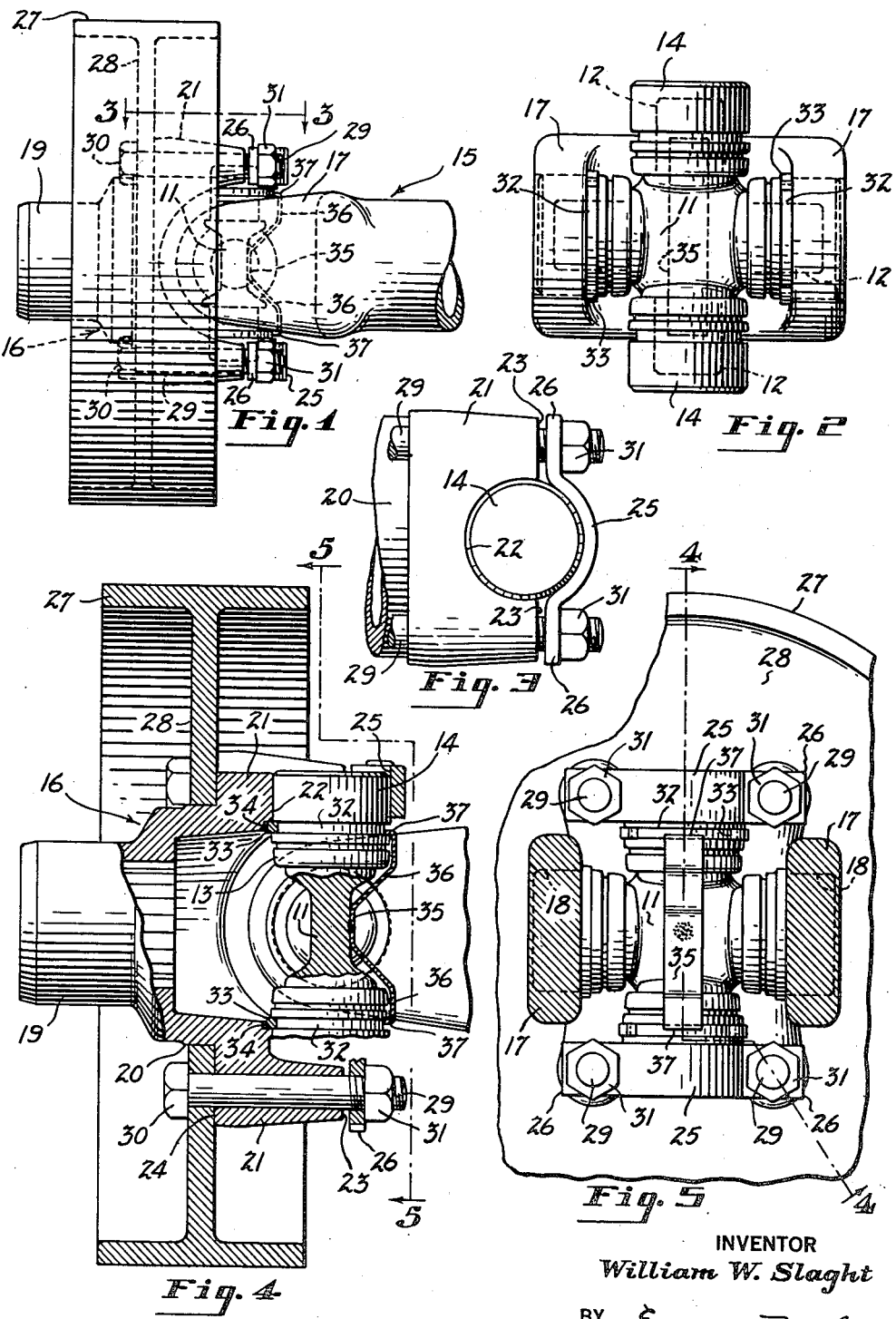
INVENTOR
William W. Slaght
BY Evans & McCoy
ATTORNEYS

United States Patent Office 2,770,114
Patented Nov. 13, 1956

2,770,114

UNIVERSAL JOINT ASSEMBLY

William W. Slaght, Rocky River, Ohio, assignor to Cleveland Steel Products Corporation, Cleveland, Ohio, a corporation of Ohio Application March 22, 1954, Serial No. 417,890

5 Claims. (Cl. 64—17)

This invention relates to universal joints of the type used in automobile transmissions and more particularly to a universal joint assembly in automobile transmissions.

The joint of the present invention comprises two yokes pivoted to a cross to swing about axes at right angles one to the other. One of the yokes, which may be referred to as the swinging yoke, is adapted for attachment to a driven shaft which connects the driving mechanism to the rear axle and which has angular swinging movements during travel of the vehicle. The other yoke, which may be referred to as the driving yoke, is mounted on the vehicle body and attached to a drive shaft. The trunnions of the cross are journaled in bearing cups that are mounted in openings formed in the yoke arms to slidably receive the cups so that they can be inserted axially through the openings onto the cross trunnions or be removed axially through the openings. Suitable means, such as removable spring clips mounted on the inner ends of the cups and engaging the inner faces of the arms, serve to hold the cups in place on the trunnions when the joint is assembled.

In order to facilitate shipment of the joint and assembly thereof on a motor vehicle, the driving yoke has arms provided with separable portions that permit the cross to be quickly and easily attached to or detached therefrom. The cross is preferably mounted on the swinging yoke before assembly with the driving yoke and may be shipped with the swinging yoke to the place of assembly on the motor vehicle and means is preferably provided on the cross for retaining the bearing cups on free trunnions when the cross is detached from the driving yoke. The arms of the driving yoke are divided in a plane normal to the yoke axis and crossing the cup receiving openings to provide separable cup retaining caps which when detached permit axial separation of the cross and swinging yoke from the driving yoke.

An emergency brake drum is commonly mounted on the driving yoke and, in order to simplify the assembly and reduce the cost of manufacture, four attaching bolts are provided that extend axially through the brake drum web and through the arms of the driving yoke, the bolts being disposed one on each side of each cup receiving opening and through the ends of the cup retaining caps.

Objects of the invention are to simplify the assembly of a joint, to reduce the cost of manufacture thereof and to provide a joint in which the yokes may be disconnected without disturbing the trunnion bearings.

Reference should be had to the accompanying drawings forming a part of this specification in which:

Figure 1 is a side elevation of a universal joint assembly embodying the invention;

Fig. 2 is an end elevation showing the cross and swinging yoke detached from the driving yoke;

Fig. 3 is a fragmentary section taken on the line indicated at 3—3 in Fig. 1;

Fig. 4 is a longitudinal section taken on the line indicated at 4—4 in Fig. 5; and Fig. 5 is a transverse section taken on the line indicated at 5—5 in Fig. 4.

The universal joint of the present invention has a cross 11 provided with four equiangularly spaced radially projecting trunnions 12 and with shoulders 13 at the inner ends of the trunnions. The trunnions 12 are journaled in externally cylindrical bearing cups 14 which are mounted in the arms of two yokes 15 and 16. The diametrically opposite trunnions are axially alined and each pair of axially alined trunnions provide the pivotal connection for one of the yokes. The yoke 15 is adapted to be connected to the longitudinal shaft which extends from the joint to the rear axle and may be termed the swinging yoke. The yoke 16 is rotatably mounted on the vehicle body, is driven by the engine drive shaft and may be referred to as the driving yoke. The swinging yoke 15 has integral axially extending arms 17 disposed on opposite sides of its axis, the arms 17 being each formed in one piece and the two arms 17 having axially alined cylindrical openings 18 in which diametrically opposite bearing cups 14 have a sliding fit. The driving yoke 16 has a tubular hub portion 19 which is internally splined for connection to a drive shaft. The hub 19 has an enlarged externally cylindrical end portion 20 and axially extending yoke arms 21 are formed integrally with the enlarged portion 20. The yoke arms 21 are provided with openings to receive the two diametrically opposite bearing cups 14 that are alined on an axis at right angles to the axis of the trunnions forming the pivot of the swinging yoke 15, the arms 21 being divided in a plane normal to the axis of the yoke 16 in order to provide a readily detachable connection between the driving yoke and cross.

The inner portions of the arms 21 are provided with substantially semi-cylindrical cup receiving seats 22 and with flat end faces 23 and flat shoulders 24 at their inner ends. The outer portions of the arms 21 are in the form of separable caps 25 that are centrally arched to conform to the bearing cups 14, the caps 25 having end flanges 26 which overlie the flat faces 23. The flat shoulders 24 at the inner ends of the yoke arms 21 are perpendicular to the yoke axis and extend outwardly from the cylindrical enlarged portion 20 of the hub.

A brake drum 27 forming part of the emergency brake of the automobile is attached to the driving yoke 16 and this drum has a central web 28 that has a central opening that fits upon the enlarged portion 20 of the hub, the web 28 being clamped against the shoulders 24 by means of clamping bolts 29, which serve not only to clamp the brake drum to the yoke, but also to hold the bearing retaining caps 25 in place. Four clamping bolts are employed, two bolts extending axially through each of the arms 21 on opposite sides of the cup receiving openings. Each clamping bolt has a head 30 that engages with the web 28 of the brake drum and each of the bolts extends through an end flange 26 of a retaining cap, the ends of the bolts projecting through the flanges 26 receiving nuts 31 by means of which the retaining caps 25 are held in place.

Each of the bearing cups 14 is provided with an external circumferential groove 32 adjacent its inner end which receives a ring-shaped retaining clip 33 which extends somewhat more than half way around the bearing cup and which is formed of resilient metal so that it can be sprung into and out of gripping engagement with the bearing cup. The retaining clips 33 project slightly beyond the periphery of the bearing cups and engage with the inner faces of the yoke arms to prevent outward movement of the cups 14 in the yoke arms. The clips 33 are of uniform radial thickness so that they can be angularly adjusted in the grooves 32 into and out of positions where they engage with arcuate shoulders 34 on the yoke arms which prevent accidental displacement of the clips from the grooves 32. The clips 33 may be turned in the grooves 32 out of engagement with the shoulders 34 to positions where they can be sprung out of engagement with the cups to permit removal of individual cups from the trunnions by axial movement through the yoke arm openings.

By detaching the retaining caps 25 the cross may be removed axially from the driving yoke 16 and in assembling the joint on the motor vehicle the caps 25 are removed to permit ready assembly of the swinging yoke and cross with the driving yoke.

In order to facilitate the shipment of the swinging yoke and cross detached from the driving yoke and in order to permit detachment of the swinging yoke and cross from the driving yoke without disturbing the trunnion bearing, means is provided for retaining the trunnion bearing cups which are mounted in the driving yoke in place on the cross independently of the retaining clips 33. To this end a retainer in the form of a resilient metal strip 35 is welded substantially midway between its ends to the cross and has end portions 36 which form spring arms extending from the central portion of the cross over the inner ends of the two axially alined bearing cups that are mounted in the driving yoke.

Each of the spring arms 36 has an inturned end flange 37 that engages in the groove 32 of each of the bearing cups which it overlies. The retaining arms 36 serve to hold the bearing cups 14 in place on the cross when the swinging yoke 15 and cross 11 are detached from the driving yoke 16 and either of the arms 36 can be sprung outwardly to release its bearing cup when it is desired to remove the same from its trunnion.

The retaining caps 25 are normally held in gripping engagement with the bearing cups with which they engage, but either of these bearing cups can be removed and replaced without disconnecting the joint if so desired by loosening the nuts 31, removing the clip 33 and springing the retaining arm 36 to disengage the flange 37 from the grooves 32.

It is to be understood that in accordance with the provisions of the patent statutes, variations and modifications of the specific devices herein shown and described may be made without departing from the spirit of the invention.

What I claim is:

1. A universal joint comprising a cross provided with two pairs of diametrically opposite trunnions axially alined on crossing axes, a bearing cup slidably fitting on each trunnion, each cup having a peripheral groove adjacent its inner end, a driving yoke and a swinging yoke each having a central hub portion and a pair of arms integral with the hub at one end thereof, the arms of each yoke being offset radially outwardly from the hub and extending axially on opposite sides of the hub axis, the arms of each yoke having axially alined openings in which the bearing cups of alined trunnions slidably fit and through which said cups can be inserted onto the trunnions or removed from the trunnions, each of the arms of the swinging yoke being formed in one piece, the arms of the driving yoke being divided substantially in a plane normal to the yoke axis and across the openings to provide separable caps which are removable to detach said cross from said driving yoke without removal of bearing cups, a pair of bolts detachably holding each cap in place, the bolts of each pair extending axially on opposite sides of the cup receiving opening, a spring clip removably mounted in the peripheral groove of each of said bearing cups and engaging the inner face of a yoke arm to hold said cups against outward movement, and spring retaining means attached to said cross and yieldably engaging the grooves of the bearing cups that are mounted in said driving yoke to releasably hold the same on their trunnions when said cross is detached from said driving yoke.

2. In a universal joint a cross having oppositely extending axially alined trunnions, bearing cups on said trunnions that are provided adjacent their inner ends with circumferentially extending grooves, and releasable means for retaining said cups on said trunnions comprising spring arms attached at their inner ends to said cross and having inwardly extending end portions engaging in said grooves.

3. In a universal joint a cross having oppositely extending axially alined trunnions, bearing cups on said trunnions that are provided adjacent their inner ends with circumferentially extending grooves, and releasable means for retaining said cups on said trunnions comprising a spring metal strip having a central portion attached to said cross and arms extending outwardly from said central portion and overlying the inner ends of said cups, each arm having a flange at its end that extends into the groove of the cup which it overlies.

4. In a universal joint, a cross having oppositely extending axially alined trunnions, bearing cups on said trunnions, and spring arms attached to said cross inwardly of the bearing cups and extending outwardly in yieldable engagement with the cups, the cups and spring arms having interlocking conformations for releasably retaining the cups on the trunnions.

5. In a universal joint, a cross having oppositely extending axially alined trunnions, bearing cups on said trunnions, and releasable means for retaining said cups on said trunnions comprising a metal spring strip having a central portion attached to said cross and arms extending outwardly and overlying the niner ends of said cups, said arms and the inner ends of said cups having yieldably engaged interlocking conformations.

References Cited in the file of this patent
UNITED STATES PATENTS

| | | |
|---|---|---|
| 2,228,715 | Wollner | Jan. 14, 1941 |
| 2,273,920 | Anderson | Feb. 24, 1942 |